United States Patent [19]  
Lockwood

[11] 3,794,249  
[45] Feb. 26, 1974

[54] ADJUSTABLE SPRINKLER VALVE
[76] Inventor: George H. Lockwood, 2125 N.E. 27th Dr., Wilton Manors, Fla. 33305
[22] Filed: Sept. 27, 1971
[21] Appl. No.: 184,306

[52] U.S. Cl............. 239/539, 239/582, 239/DIG. 1, 251/205
[51] Int. Cl............................................. B05b 1/32
[58] Field of Search ........... 251/205, 239, 154, 155; 239/539, 582, DIG. 1

[56] References Cited  
UNITED STATES PATENTS

| 2,723,879 | 11/1955 | Martin | 251/154 X |
| 429,464 | 6/1890 | Merrill | 251/154 X |
| 242,107 | 5/1881 | Boyle | 251/205 X |
| 2,697,582 | 12/1954 | Grosch | 239/539 X |
| 2,980,392 | 4/1961 | Greenwood | 251/205 X |

Primary Examiner—Arnold Rosenthal

[57] ABSTRACT

A sprinkler head including an adjustable valve with a valve opening and a movable valve means. The valve means includes a gate means movable into and out of the valve opening. The gate means and valve opening form a valve port to control fluid flow at relatively low fluid flow rates. The valve port includes a port perimeter and cross sectional port area in a plane lying generally perpendicular to the flow of fluid. The valve port is varied in size while maintaining a continuous port perimeter with a generally wide cross sectional port area.

1 Claim, 3 Drawing Figures

ADJUSTABLE SPRINKLER VALVE

BACKGROUND OF THE INVENTION

This invention relates to a new and improved sprinkler head with a variable sized valve port having a continuous perimeter, and, more particularly, to a sprinkler valve with a movable gate that varies the size of the cross sectional port area and port perimeter while maintaining a relatively wide valve port.

In the past, lawn sprinkler valves includes stems movable toward and away from a valve seat to vary the fluid flow rate by varying the size of the port opening. Such valves provide a very long-thin port opening at the lower fluid flow rates. A small variance in the height of the port opening substantially changes the fluid flow rate. Also such long-thin port openings are easily clogged by debris and mineral deposits. The clogging problem prevents practical use of the sprinkler valves at lower fluid flow rates unless the water being used is exceptionally clean and free from solid particles and mineral deposits.

BRIEF DESCRIPTION OF THE INVENTION

An adjustable sprinkler head including a body member with a valve opening therein, a spray head member removably connected to said body member, and a valve means including a steam movably connected to said spray head member with a gate means on the stem that is movable into and out of the valve opening in the body member. The valve gate and valve opening form a valve port having a continuous perimeter and cross sectional area lying in a plane passing across the valve throat. The unbroken cross sectional port area is in a plane lying generally perpendicular to the direction of flow of the fluid. The size of the valve port is varied by adjusting the valve gate. The valve port is relatively wide over the entire range of the lower fluid flow rates. The size and shape of the cross sectional areas allows relatively large foreign particles to pass through the valve port.

It is the object of this invention to provide a noncomplex valve means that provides a relatively wide valve port at each position of the movable valve gate.

Another object of this invention is to reduce all sides of the perimeter of the valve opening during movement of the valve gate.

An additional object of this invention is to provide a variable sized port opening that has a geometric shape having a minor dimension that is never less than one third of its major dimension.

In accordance with these and other objects which will be apparent hereinafter, the instant invention will now be described with particular reference to the accompanying drawing.

DESCRIPTION OF THE PREFERRED EMBODIMENT

Figure 1:
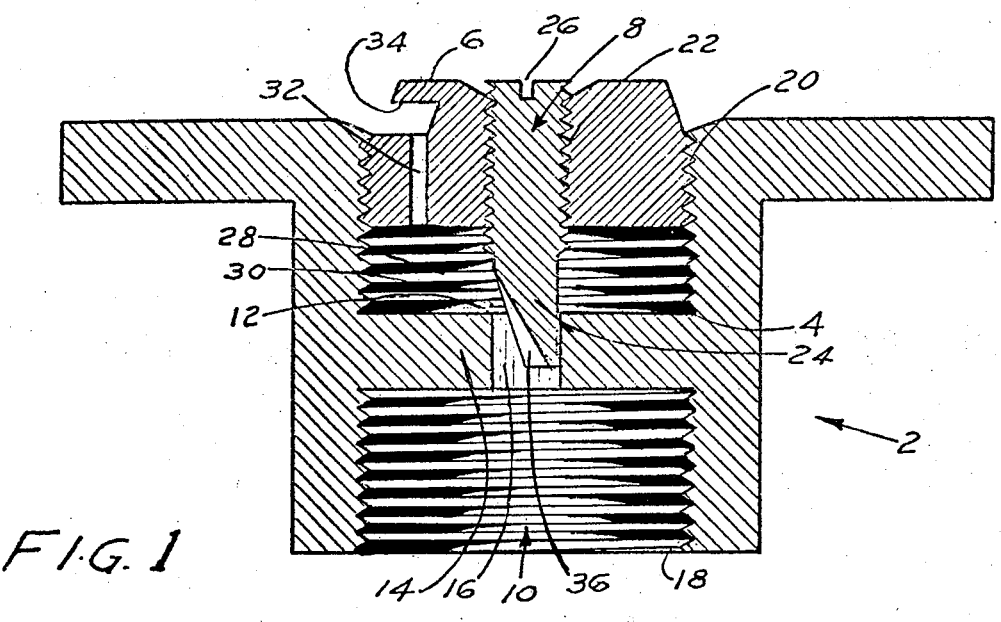
FIG. 1 is a cross sectional side view of the sprinkler head with the valve gate in an open position.

Referring now in detail to the drawing, wherein a preferred embodiment of the invention is shown, and, particularly, to FIG. 1, the sprinkler head 2 includes a body member 4, a spray head member 6, and a valve means 8. The body member 4 includes an inlet 10, an outlet 12, and an intermediate body portion 14 having a body opening 16. The body member 4 is connected to a fluid system, not shown, by threaded portion 18. The spray head 6 is connected to the outlet 12 by matching threads 20.

The stem 8 is movably connected to the spray head 6 by matching threads 22. A gate portion 24 is located at the distal end of the stem 8. The valve gate and the valve opening form the valve port. The size of the valve port is varied by inserting a screw driver in slot 26 to move the valve gate into and out of the valve opening. The valve port thus formed has a continuous perimeter and a generally wide cross sectional area lying generally perpendicular to the flow of fluid. It has been found that the anti-clogging characteristics of the valve will be satisfactory for general usage when the variable cross sectional area has a geometric shape in which the minor dimension is never less than one third of the major dimension.

Figures 2, 3:
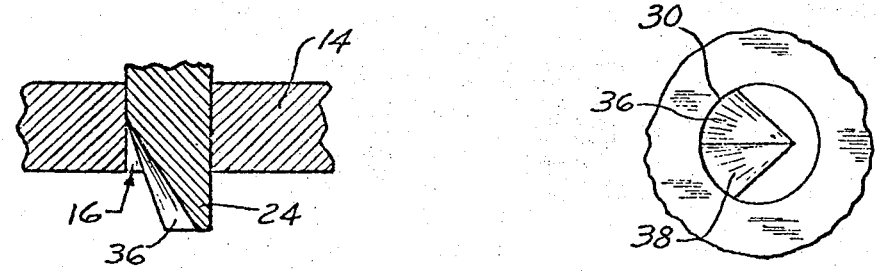
FIG. 2 is a cross sectional side view of the valve gate and valve opening in a closed position.
FIG. 3 is a bottom view of the valve gate and valve opening shown in FIG. 2.

The valve port perimeter, as shown in FIGS. 1, 2, and 3, includes edge 30 of the intermediate body portion 14 and the two flat faces 36 and 38 in the valve gate 24. The valve stem 8 is adjusted to vary the size of the unbroken cross sectional port area of the valve port between a partially opened position, as shown in FIG. 1, and a closed position, as shown in FIG. 2.

The shape of the face of the gate and slope of the face of the gate may be varied in order to provide a valve port opening having a geometric shape different than the one illustrated in the drawing. The valve port perimeter may be circular, triangular or other various shapes.

In use, the fluid flows through the body inlet 10, body opening 16, the valve throat, generally designated by numeral 28, the body outlet 12, and out through the spray head opening 32 into engagement with the deflector 34. The size of the valve port at the valve throat is varied by adjusting the valve stem 8.

A few examples of the major dimensions are:
1. In a circle, the diameter.
2. In an ellipse, the major axis.
3. In a triangle, the longest side or altitude or height.
4. In a quadrilateral, the longest side.
5. In a polygon, the longest side or altitude or height.

A few examples of the minor dimensions are:
1. In a circle, the diameter.
2. In an ellipse, the minor axis.
3. In a triangle, the shortest side or altitude.
4. In a quadrilateral, the shortest side or altitude or height.
5. In a polygon, the shortest side or altitude or height.

The instant invention has been shown and described herein in what is considered to be the most practical and preferred embodiment. It is recognized, however, that departures may be made therefrom within the scope of the invention and that obvious modifications will occur to the person skilled in the art.

What is claimed is:

1. An irrigation sprinkler comprising;

a fluid inlet in the sprinkler, a fluid passage through the sprinkler for conducting fluid from said fluid inlet to a discharge orifice in the sprinkler, a spray head connected to said sprinkler wherein said discharge orifice is disposed, a reflector surface connected adjacent said discharge orifice, said discharge orifice being located and arranged such that the discharge fluid from said discharge orifice impinges on said reflector surface for the purpose of creating a prescribed pattern of small droplets of fluid, a throttle member of generally cylindrical shape directly connected to said spray head in said fluid passage and axially adjustable in a conforming cylindrical throttle hole, said throttle hole being part of said fluid passage, a tapered throttling notch in the cylinderical side of said throttle member to provide a fluid path past said throttle member, and a throttle opening formed by said throttling notch and said throttle hole, said throttle opening being adjustable in size by the axial adjustment of said throttle member, said throttle opening being generally triangular having the lenth of the shortest side of the triangular opening greater than one third the length of the longest side.

* * * * *